July 19, 1960 H. M. GEYER 2,945,387
ROTARY ACTUATOR

Filed Feb. 19, 1959 2 Sheets-Sheet 1

INVENTOR.
Howard M. Geyer
BY
W. E. Finken
His Attorney

July 19, 1960

H. M. GEYER 2,945,387

ROTARY ACTUATOR

Filed Feb. 19, 1959

INVENTOR.
Howard M. Geyer
BY
*W. E. Finke*
His Attorney

United States Patent Office 2,945,387
Patented July 19, 1960

2,945,387

ROTARY ACTUATOR

Howard M. Geyer, Dayton, Ohio, assignor to General Motors Corporation, Detroit, Mich., a corporation of Delaware Filed Feb. 19, 1959, Ser. No. 794,280

16 Claims. (Cl. 74—89)

This invention pertains to rotary actuators, and particularly to rotary actuators of the helical spline type.

Heretofore, helical spline rotary actuators have been manufactured comprising a stationary cylinder having internally helical spline teeth, a reciprocating piston having a skirt portion with internal and external helical spline teeth, and a rotary output member having external helical spline teeth. Actuators of this type, as shown in Patent Numbers 2,773,483 and 2,791,128, have not been extensively used due to the high cost of manufacture, particularly the cost of forming the long internal helical spline teeth on the inner wall of the cylinder. The present invention relates to a modified form of a helical spline rotary actuator wherein the long spline members are both of the male type. That is, the actuator includes a pair of externally helically splined sleeves, and the piston includes spaced internally helical splined sections which mate respectively with the externally helical splined sleeves.

Accordingly, among my objects are the provision of an improved helical spline assembly for converting reciprocation into rotation; the further provision of a rotary actuator including externally helical splined reaction and output members; and the still further provision of a rotary actuator of the helical spline type including a centrally located rotary output shaft which extends through the helically splined sleeves so as to provide a double ended output.

The aforementioned and other objects are accomplished in the present invention by embodying a pair of externally helically splined sleeves within the actuator in combination with a two-part piston assembly having relatively short internally helically splined portions mating with the sleeves. Specifically, in the embodiment disclosed herein the actuator comprises a stationary cylinder having a two-part piston disposed therein for reciprocable movement. The piston divides the cylinder into opposed actuator chambers which can be alternately exposed to pressure and drain so as to impart reciprocation to the piston. Each piston section is formed with relatively short internal helical spline teeth, one section of which mates with an externally splined reaction sleeve rigidly connected to the cylinder so as to be restrained against rotation. The other helically splined piston section mates with an externally helically splined output sleeve which is rigidly connected to a centrally located rotary output shaft.

The rotary output shaft is bearing mounted within a cylinder adjacent opposite ends thereof and projects from both ends of the cylinder. The externally splined reaction and output sleeves can be of the same hand, different hands, the same leads, or different leads, depending upon the load to be moved by the rotary output shaft. In instances where a maximum angular movement is desired with a minimum torque, the two externally splined sleeves are of different hands and of the same lead. In instances where a minimum angular movement is required with maximum torque, the externally splined sleeves are of the same hand and of different leads.

Further objects and advantages of the present invention will be apparent from the following description, reference being had to the accompanying drawings, wherein a preferred embodiment of the present invention is clearly shown.

Figure 1:
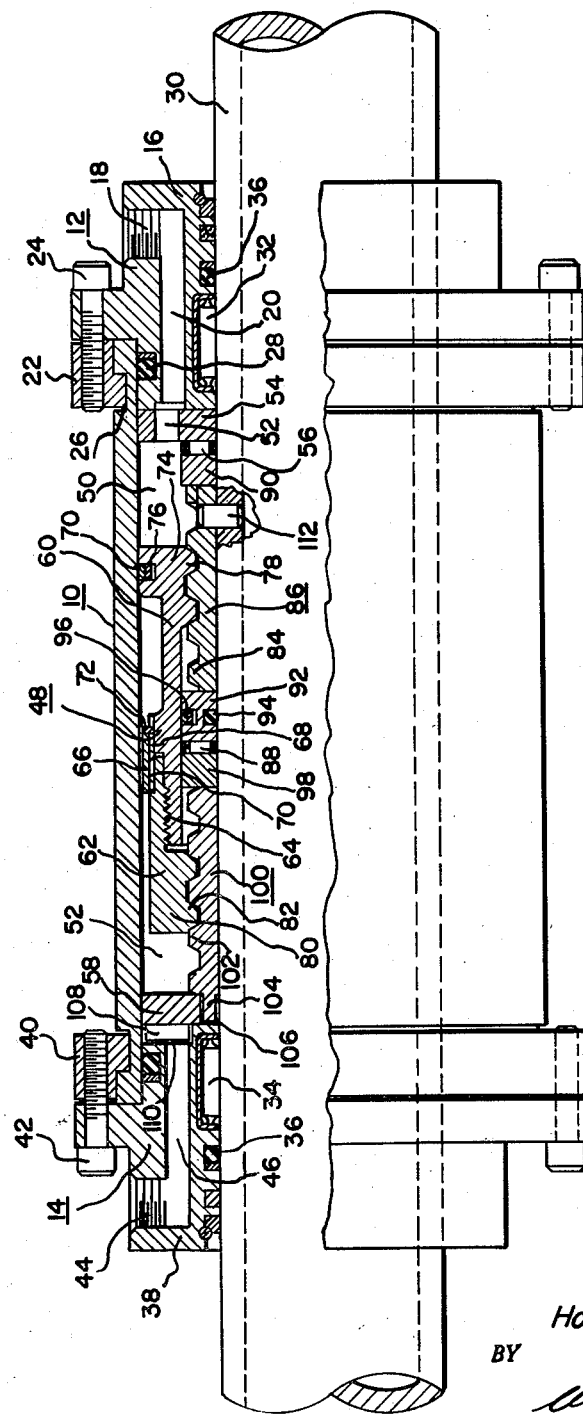
Figure 1 is a view, partly in section and partly in elevation, of an actuator constructed according to the present invention.

With particular reference to Figure 1, an actuator is shown including a cylinder sleeve 10, opposite ends of which are closed by end cap assemblies 12 and 14. The cylinder assembly is adapted for connection to a suitable fixed support, not shown. The end cap assembly 12 includes an annulus 16 having a port 18 therein connecting with an axial passage 20. The annulus 16 is attached to one end of the cylinder sleeve 10 by means of a ring 22 and a plurality of screws 24, the ring 22 having an offset portion disposed within an external groove 26 of the cylinder sleeve 10. An O-ring seal 28 is disposed between the annulus 16 and the inner wall of the cylinder 10.

A hollow shaft 30 is rotatably journalled in the end cap assemblies 12 and 14 by roller bearings 32 and 34, respectively. The hollow shaft 30 extends through both end cap assemblies and constitutes the rotary output element of the actuator. The annulus 16 carries a second O-ring seal 36 which sealingly engages the outer periphery of the shaft 30.

The end cap assembly 14 is identical to the end cap assembly 12 and hence will not be described in detail. Thus, the end cap assembly 14 includes an annulus 38 which is connected to a ring 40 by a plurality of screws 42. The annulus 38 is formed with a port 44 that communicates with an axial passage 46.

A reciprocable piston assembly 48 is disposed within the cylinder 10 and divides the cylinder into opposed chambers 50 and 52. The passage 20 in the annulus 16 communicates with the chamber 50 through a passage 52 in the outer race member 54 of a needle bearing assembly 56. The passage 46 communicates with the chamber 52 through passage means, not shown, in a locking ring 58.

Figure 4:
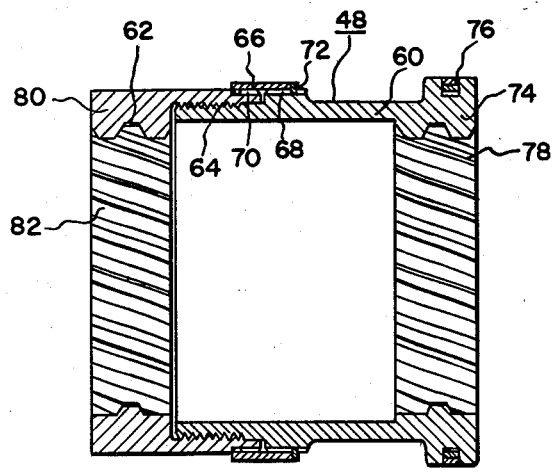
Figure 4 is a sectional view of the piston assembly.

With reference to Figure 4, the piston assembly 48 comprises a pair of sleeves 60 and 62 threadely interconnected at 64. The sleeves 60 and 62 are retained in assembled relation by a straight spline locking ring 66 which engages straight spline teeth 68 and 70 formed on the sleeves 60 and 62, respectively, and is retained in assembled relation with the sleeves by a snap ring 72. The sleeve 60 includes a head portion 74 having piston rings 76 for sealingly engaging the inner wall of the cylinder 10. The inner periphery of the head portion 74 is formed with helical spline teeth 78. The sleeve 62 includes a flanged portion 80 having internal helical spline teeth 82.

Figure 2:
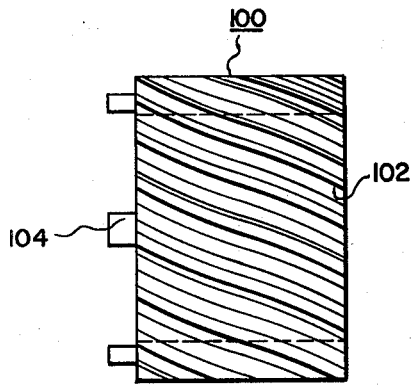
Figures 2 and 3 are views in elevation of the helically splined sleeves.
Figure 3:
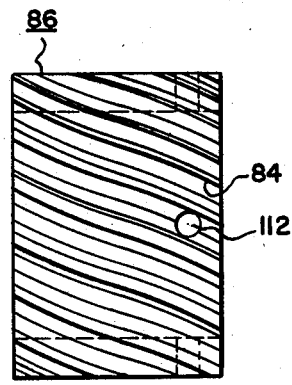

With reference to Figures 1 through 3, the helical spline teeth 78 mate with a complementary set of externally helical spline teeth 84 formed on a rotary sleeve member 86. The sleeve 86 is journalled for rotation relative to the shaft 30 and the cylinder assembly by needle bearings 56 and 88. The inner race of the needle bearing 56 comprises a ring 90 which abuts one end of the sleeve 86, and the inner race of the needle bearing 88 comprises an internally and externally grooved ring 92 carrying the O-ring seal 94 which engages the shaft 30 and a piston ring seal 96 which engages the inner surface of the sleeve 60. The outer race 98 of the needle bearing assembly 88 abuts one end of a reaction sleeve member 100 having externally helical spline teeth 102. The helical spline teeth 102 mate with the helical spline teeth 82 on the sleeve 62.

The sleeve 100 is restrained against rotation relative to both the cylinder assembly and the shaft 30 by the locking ring 58. Thus the sleeve 100 is formed with a plurality of circumferentially spaced axially extending tangs 104 which are received in slots 106 of the locking ring 58. The locking ring 58 is keyed to the annulus 38 by a set of circumferentially spaced locking tangs 108 which are disposed within slots 110 of the annulus 38.

The rotary splined sleeve 86 is rigidly connected to the shaft 30 by a plurality of dowel pins, one of which is indicated by numeral 112 in Figure 1. Since the helical spline sleeve 100 is restrained against all movement, reciprocation of the piston assembly 48 is accompanied by a slight angular movement thereof due to the interaction of the helical splines 82 and 102. This angular movement of the piston assembly 48 will be imparted to the rotary sleeve 86, and through the interaction of helical splines 78 and 84, the sleeves 86 and the shaft 30 will be angularly adjusted throughout a distance that is equal to the sum of the rotation caused by the spline teeth 82 and 102 and 78 and 84. Reciprocation of the piston assembly 48 is effected by subjecting the chambers 50 and 52 to a pressure differential. Thus, if the chamber 50 is subjected to pressure and the chamber 52 is connected to drain, the piston assembly 48 will move to the left, as viewed in Figure 1 thereby imparting angular movement to the shaft 30 in one direction. Conversely, if the chamber 52 is subjected to pressure and the chamber 50 is connected to drain, the piston assembly 48 will move to the right, as viewed in Figure 1 thereby imparting angular movement of the shaft 30 in the opposite direction. The load device to be adjusted can be connected to the shaft 30 at both ends of the actuator assembly since the shaft 30 projects through both end cap assemblies.

The extent of angular movement of the shaft 30 during the stroke of piston assembly 48 is determined by the character of the helical spline teeth on the sleeves 100 and 86. In instances where it is desired to have a maximum rotary output with a minimum torque, the sleeves 86 and 100 have their spline teeth 84 and 102, respectively, of different hands and of the same lead. In instances where a minimum angular movement of the output shaft 30 is required with a maximum torque, the sleeves 86 and 100 have helical spline teeth of the same hand and of different leads.

From the foregoing it is readily apparent that the present invention greatly simplifies and reduces the cost of manufacture of rotary actuators including helically splined members since the long spline teeth are external rather than internal. In addition, the actuator assembly disclosed herein enables the use of a rotary output shaft which extends from both ends of the cylinder assembly and is bearing supported adjacent both ends.

While the embodiments of the invention as herein disclosed constitutes a preferred form, it is to be understood that other forms might be adopted.

What is claimed is as follows:

1. A fluid pressure operated rotary actuator, including, a cylinder, a reciprocable piston assembly disposed within said cylinder capable of fluid pressure actuation in both directions, an output element rotatably supported in said cylinder, a pair of sleeves having external helical spline teeth and disposed within said cylinder, one of said sleeves being restrained against rotation relative to said cylinder and the other of said sleeves being supported for rotation relative to said cylinder, said piston assembly having spaced sets of internal helical spline teeth mating with said sleeves whereby reciprocation of said piston assembly imparts rotation to said rotatably mounted sleeve, and means connecting said rotatable sleeve and said output element.

2. A rotary actuator including, a cylinder, a reciprocable piston assembly disposed within said cylinder capable of fluid pressure actuation in both directions, a reaction member disposed within said cylinder and restrained against rotation relative thereto, and a rotary member disposed within said cylinder and supported for rotation relative thereto, said members having external helical means, said piston assembly having internal helical means mating with the external helical means of said members whereby reciprocation of said piston assembly imparts rotation to said rotary member.

3. A rotary actuator including, a cylinder, a reciprocable piston assembly disposed within said cylinder capable of fluid pressure actuation in both directions, a reaction member disposed within said cylinder and restrained against rotation relative thereto, and a rotary member disposed within said cylinder and supported for rotation relative thereto, said members having external helical spline teeth, said piston assembly having spaced sets of internal helical spline teeth mating with the external spline teeth of said members whereby reciprocation of said piston assembly imparts rotation to said rotary member.

4. A rotary actuator including, a cylinder, a reciprocable piston assembly disposed within said cylinder capable of fluid pressure actuation in both directions, a reaction member disposed within said cylinder and restrained against rotation relative thereto, and a rotary member disposed within said cylinder and supported for rotation relative thereto, said members being spaced apart and coaxially arranged and having external helical spline teeth, said piston assembly having spaced sets of internal helical spline teeth mating with the external spline teeth of said members whereby reciprocation of said piston assembly imparts rotation to said rotary member.

5. The rotary actuator set forth in claim 4 wherein said piston assembly comprises a pair of interconnected sleeves.

6. The rotary actuator set forth in claim 5 wherein one of said sleeves includes a head portion having sealing engagement with said cylinder so as to divide said cylinder into a pair of opposed chambers.

7. The rotary actuator set forth in claim 4 wherein said reaction member is keyed to said cylinder.

8. A rotary actuator including, a cylinder, a reciprocable piston assembly disposed within said cylinder capable of fluid pressure actuation in both directions, a reaction member disposed within the cylinder and restrained against rotation relative thereto, a rotary member disposed within said cylinder and supported for rotation relative thereto, said members having external helical spline teeth, said piston assembly having spaced sets of internal helical spline teeth mating with the external helical spline teeth on said members whereby reciprocation of said piston assembly imparts rotation to said rotary member, an output shaft rotatably journalled in said cylinder, and means connecting said rotary member and said output shaft.

9. A rotary actuator including, a cylinder assembly including a pair of spaced end caps and a sleeve portion disposed therebetween and rigidly connected thereto, a reciprocable piston assembly disposed within the sleeve portion of said cylinder assembly capable of fluid pressure actuation in both directions, a pair of axially spaced coaxial sleeve members disposed within said cylinder assembly having external helical spline teeth, one of said sleeve members being restrained against rotation relative to said cylinder assembly and the other of said sleeve members being supported for rotation relative to said cylinder assembly, said piston assembly having spaced sets of internal helical spline teeth mating with the external helical spline teeth of said sleeve members whereby reciprocation of said piston assembly imparts rotation to said rotatable sleeve member, an output shaft coaxially rotatably supported within said cylinder assembly and extending through said sleeve members, and means connecting said rotary sleeve member and said output shaft.

10. The rotary actuator set forth in claim 9 including bearing means carried by each end cap for rotatably supporting said output shaft.

11. The rotary actuator set forth in claim 9 wherein said piston assembly comprises a pair of interconnected sleeves.

12. The rotary actuator set forth in claim 11 wherein one of said piston sleeves includes a head portion having sealing engagement with the sleeve portion of said cylinder assembly so as to divide said cylinder assembly into opposed chambers.

13. A rotary actuator assembly including, a cylinder, reciprocable piston means disposed within said cylinder, a pair of members disposed within said cylinder having external helical means, means connecting one of said members with said cylinder so as to prevent movement thereof, and means supporting the other member for rotation relative to said cylinder, said piston means having internal helical means mating with the external helical means of said members whereby reciprocation of said piston means imparts rotation to said other member.

14. A rotary actuator assembly including, a cylinder, a reciprocable piston assembly disposed within said cylinder, a pair of members disposed within said cylinder having external helical spline teeth, means connecting one of said members with said cylinder so as to prevent movement thereof, and means supporting the other member for rotation relative to said cylinder, said piston assembly having spaced sets of internal helical spline teeth mating with the external helical spline teeth of said members whereby reciprocation of said piston assembly imparts rotation to said other member.

15. A rotary actuator assembly including, a cylinder, a reciprocable piston assembly disposed within said cylinder, a pair of spaced coaxial members disposed within said cylinder having external helical spline teeth, means rigidly connecting one of said members with said cylinder so as to prevent movement thereof, and bearing means supporting the other member for rotation relative to said cylinder, said piston assembly having spaced sets of internal helical spline teeth mating with the external helical spline teeth of said members whereupon reciprocation of said piston assembly imparts rotation to said other member.

16. A rotary actuator assembly including a cylinder, a reciprocable piston assembly disposed within said cylinder, a pair of opposed coaxial sleeve members disposed within said cylinder having external helical spline teeth, means connecting one of said sleeve members with said cylinder so as to prevent movement thereof, means supporting the other sleeve member for rotation relative to said cylinder, said piston assembly having spaced sets of internal helical spline teeth mating with the external helical spline teeth of said sleeve members whereby said piston assembly imparts rotation to said other sleeve member, a shaft supported for rotation relative to said cylinder and extending through said sleeve members, and means connecting said other sleeve member and said shaft for imparting rotation thereto during reciprocation of said piston assembly.

References Cited in the file of this patent
UNITED STATES PATENTS

| | | |
|---|---|---|
| 2,117,225 | Stein | May 10, 1938 |
| 2,568,404 | Nordone | Sept. 18, 1951 |
| 2,791,128 | Geyer et al. | May 7, 1957 |